May 11, 1943.  A. M. ANDREWS  2,319,104
SOAP HOLDER
Filed Feb. 21, 1942
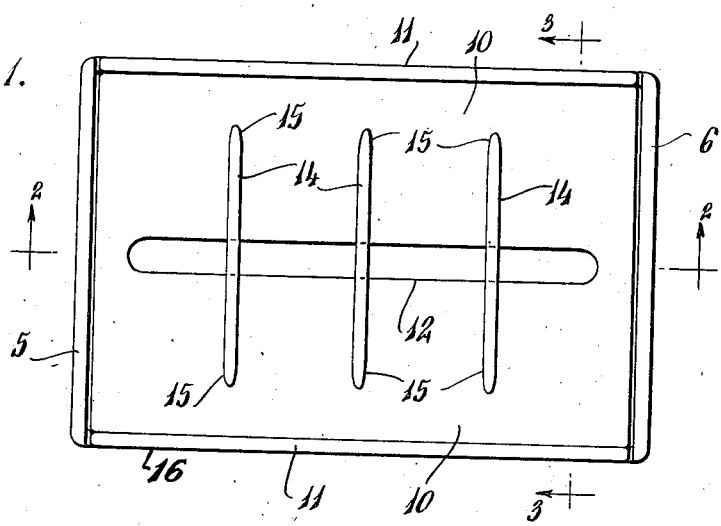
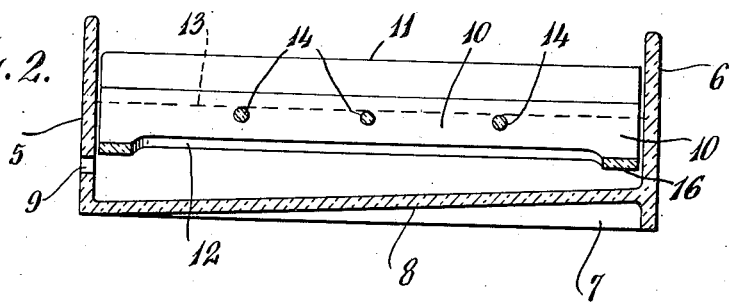
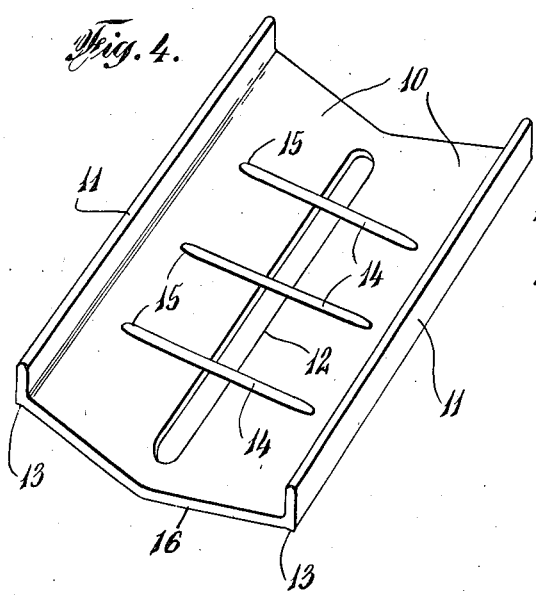
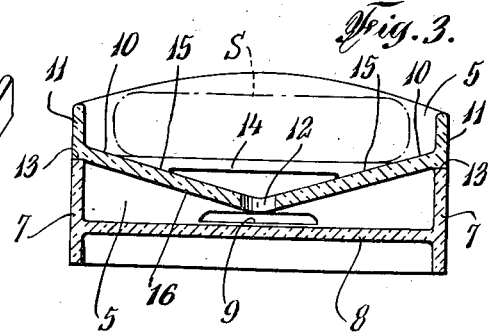
INVENTOR.
Agnes M. Andrews
BY
John O. Seifert
ATTORNEY Patented May 11, 1943

2,319,104

UNITED STATES PATENT OFFICE 2,319,104

SOAP HOLDER

Agnes M. Andrews, Jersey City, N. J.

Application February 21, 1942, Serial No. 431,808

4 Claims. (Cl. 45—28)

This invention relates to holders for a cake of soap consisting of a receptacle to catch the drippings of liquid and soap from a cake of soap supported in the receptacle by a support removably suspended in the receptacle.

It is an object of the invention to provide in a soap holder of this character a receptacle to catch drippings of liquid and soap from a cake of soap and arranged to cause said drippings to flow and accumulate at a side wall portion in the receptacle below a discharge opening in said side wall portion whereby the liquid accumulating in the receptacle may readily overflow through said opening without contacting the cake of soap, or may be emptied from the receptacle through said opening by tilting the receptacle.

Another object of the invention is to provide a support for a cake of soap arranged to engage the cake of soap at spaced portions and position the cake of soap in a horizontal plane in spaced relation above a discharge opening disposed centrally in a drainage area of the support whereby the liquid drippings from the cake of soap will readily leave the soap and will not adhere to the soap and the support with a consequent absorption of the liquid by and softening of the soap, and said positioning of the cake of soap will induce a circulation of the atmosphere around the cake to effect the hardening of the same between intervals of use.

A further object of the invention is to arrange the receptacle and soap support with vertical wall portions whereby the support is readily mounted in the receptacle and retained therein against lateral movement and forms therewith an enclosing wall around the cake of soap disposed in the holder to prevent movement of the cake of soap laterally from the holder.

It is another object of the invention to arrange the receptacle and soap support with a structure to permit molding or casting the same in an inexpensive and expeditious manner.

Further objects and advantages will be set forth in the detailed description of the invention.

In the drawing accompanying and forming a part of this application,

Figure 1 is a view looking at the top of a holder for a cake of soap forming the embodiment of the invention.

Figure 2 is a longitudinal sectional view of the holder taken on the line 2—2 of Figure 1 looking in the direction of the arrows.

Figure 3 is a cross sectional view taken on the line 3—3 of Figure 1 looking in the direction of the arrows.

Figure 4 is a perspective view of a support for a cake of soap forming a part of the soap holder.

In carrying out the embodiment of the invention illustrated in the accompanying drawing, there is provided a receptacle of suitable material, preferably moldable material, and of rectangular shape having end walls 5, 6 arranged with a flat bottom edge and an arched or upwardly curved top edge, as clearly shown in Figure 3. The end walls are connected to each other by integral side walls 7 of less height than the end walls and having the top and bottom edges flat, the bottom edges extending in the plane of the bottom edges of the end walls 5, 6 and the top edges extending below the juncture of the side edges and top curved edges of said end walls, as shown in Figures 2 and 3. The bottom of the receptacle is closed by a wall 8 integral with the end and side walls and inclining from the bottom edge of the end wall 5 to a portion of the end wall 6 above the bottom edge of said end wall 6, as shown in Figure 2, to induce a flow and accumulation of liquid at the end wall 5 and an excess of said accumulation or deposit of liquid is readily discharged from the receptacle through an opening 9 in the wall 5 extending in a horizontal plane of the highest end portion of the bottom wall 8 at the end wall 6.

A cake of soap shown in dot lines S in Figure 3 is supported in the receptacle by a support comprising a plate 16 of suitable material, also preferably moldable material, and having opposite portions 10 inclining at an obtuse angle from each other to form a channel plate of V shape in cross section with the side marginal edges of the portions 10 arranged with vertically extending wall portions 11 of a height substantially equal to the distance or space between the top edges of the side walls 7 and the end portions of the top curved edges of the end walls 5, 6 of the receptacle, as shown in Figure 3. The upper faces of the inclining portions 10 form a drainage area or basin having an outlet at the base or angle formed by said portions arranged in the form of an elongated opening 12 having the ends terminating within the opposite ends of the plate 16. The under face of the plate 16 at the juncture of the portions 10 and the vertical wall portions 11 extend in a horizontal plane, as shown at 13 in Figures 3 and 4, to form seats or shoulders to engage the top edges of the side walls 7 of the receptacle and suspend the plate in the receptacle.

The width of the portions 10 will position the drainage outlet 12 in the angle portion of the plate 16 formed by said portions 10 in spaced relation above the bottom 8 of the receptacle when the plate 16 is suspended in the receptacle by the shoulders 13 engaging the top edges of the side walls 7. The opposite ends of the plate 16 are open and the plate 16 is of a length so that said open ends thereof will abut the end walls 5, 6 of the receptacle and said end walls will form with the vertical walls 11 an enclosing wall around the V shaped recess of the plate 16 to prevent lateral displacement of a cake of soap from the supporting plate. The plate 16 is readily positioned in and removed from the receptacle by grasping the vertical walls 11.

The plate 16 is arranged to support a cake of soap by a series of point contacts along the length of said cake of soap in spaced relation above the discharge opening 12 in the V or angle portion of the plate 16 whereby the liquid may readily drain from the soap without accumulating on the plate 16 and being absorbed by and render the soap soft, and a circulation of atmosphere about the cake of soap is permitted to harden the soap during the period it is supported in the holder. This is accomplished by a series of bars 14 secured to the opposite plate portions 10 by the opposite end portions of the bars being integral with said plate portions, as shown at 15 in Figure 3, and spaced equal distances from each other so that only spaced portions of the cake of soap are engaged or contacted by the bars. In the present embodiment of the invention as shown, three of said bars are utilized, but it is to be understood that the number of bars may be varied without changing the scope of the invention.

In the use of the holder, liquid and softened portions of the cake of soap positioned on the bars 14 will drip or drain from the cake of soap onto the inclining plate portions 10 below the bars 14 and flow over said plate portions to and through the opening 12 and onto the declining bottom wall 8 of the receptacle and will flow longitudinally of said bottom wall toward the end wall 5 of the receptacle to accumulate to a level even with the opening 9 in said end wall and any excess of the soap residue and liquid will overflow through said opening, or it may be drained through said opening by tilting the opposite end wall 6 of the receptacle upwardly. The point contact between the bars 14 and the cake of soap will prevent accumulation of the soap residue between said bars and the cake of soap which would be absorbed by and soften the soap. The open ends of the plate 16, and the positioning of the cake of soap in spaced relation above said plate will permit the free circulation of air around the bottom of the cake of soap and facilitate the hardening of the cake of soap while it is supported by the bars 14. The portions of the end walls 5 and 6 extending above the plate portions 10 and the vertical walls 11 of the plate 16 will prevent the cake of soap from sliding laterally on the bars 14 and out of the holder.

The receptacle is readily cleaned of the soap residue therein by removing the plate 16, from the receptacle and rinsing the receptacle.

Having thus described my invention, I claim:

1. In a holder for a cake of soap, a receptacle having an open top and end, side and bottom walls, and a support for a cake of soap comprising a plate of V shape in cross section having an elongated opening in the vertex of the V and a series of spaced bars supported at the opposite end portions on the opposite wall portions of the V of the plate to extend transversely to and in spaced relation above the elongated opening in the plate and support a cake of soap and the side edges of the plate arranged to engage the edges of the opposite side walls of the receptacle and suspend the plate in the receptacle with the opening in the plate in spaced relation above the bottom wall of the receptacle to permit the flow of liquid from the cake of soap over the opposite wall portions of the plate to and through the opening therein into the receptacle.

2. In a holder for a cake of soap, a receptacle having an open top and end, side and bottom walls with the top edges of the side walls extending in an even plane and the end walls extending above the top edges of the side walls, and a support for a cake of soap comprising a plate of channel shape in cross section having an opening at the juncture of the opposite wall portions of the channel and a series of spaced bars having the opposite end portions secured to the opposite wall portions of the channel of the plate with the body of the bars extending transversely above the opening in the plate to support a cake of soap and the side edges of the plate arranged to engage the top edges of the side walls of the receptacle and suspend the plate in the open top of the receptacle between the end walls of the receptacle with the opening in the plate spaced above the bottom wall of the receptacle to permit the flow of liquid from the cake of soap over the opposite wall portions of the plate to and through the opening therein into the receptacle and the end walls of the receptacle preventing endwise movement of the cake of soap on the bars.

3. In a holder for a cake of soap, a receptacle having side and end walls and a bottom wall declining from one end wall to the opposite end wall and said latter end wall arranged with an opening therein extending in the plane of the highest portion of the bottom wall, and a support for a cake of soap comprising a plate of V shape in cross section having an opening in the vertex of the V and a series of bars having the opposite end portions integral with the opposite leg portions of the V shaped plate and the body of the bars extending transversely in spaced relation above the opening in the plate to support a cake of soap and the opposite side edges of the plate arranged to engage the top edges of the side walls of the receptacle and suspend the plate in the receptacle with the opening in the plate in spaced relation above the bottom wall of the receptacle to permit the flow of liquid from the cake of soap on the bars over the leg portions of the plate to and through the opening and onto the declining bottom wall of the receptacle and accumulate at the end wall of the receptacle arranged with the opening.

4. In a holder for a cake of soap, a receptacle having an open top and end, side and bottom walls with the top edges of the side walls extending in an even horizontal plane and the end walls extending above the side walls, and a support for a cake of soap comprising a plate having opposite portions inclining at an obtuse angle from each other with an opening in the angle formed by said portions and vertical portions extending from the opposite side edges of the inclining plate portions and the under face of the plate at the juncture of the inclining and vertical portions arranged with horizontal shoulder portions to engage the horizontal edges of the side walls of the receptacle and suspend the plate in the receptacle with the opening in the plate in spaced relation above the bottom wall of the receptacle and the vertical portions of the plate forming with the end walls of the receptacle an enclosing wall around the inclining portions of the plate, and a series of spaced bars integral with the inclining portions of the plate at the opposite end portions of the bars and the body of the bars extending transversely in spaced relation above the opening in the plate to support a cake of soap within the enclosing wall and permit the flow of liquid from the cake of soap over the inclining portions of the plate to and through the opening in the plate into the receptacle.

AGNES M. ANDREWS.